US008773806B2

(12) United States Patent
Springberg et al.

(10) Patent No.: US 8,773,806 B2
(45) Date of Patent: Jul. 8, 2014

(54) DISK-BASED STORAGE DEVICE WITH HEAD POSITION CONTROL RESPONSIVE TO DETECTED INTER-TRACK INTERFERENCE

(75) Inventors: David M. Springberg, Fort Collins, CO (US); Jefferson E. Singleton, Westminster, CO (US); Jeffrey P. Grundvig, Loveland, CO (US)

(73) Assignee: LSI Corporation, San Jose, CA (US)

( * ) Notice: Subject to any disclaimer, the term of this patent is extended or adjusted under 35 U.S.C. 154(b) by 52 days.

(21) Appl. No.: 13/368,508

(22) Filed: Feb. 8, 2012

(65) Prior Publication Data

US 2013/0201579 A1 Aug. 8, 2013

(51) Int. Cl.
*G11B 21/02* (2006.01)

(52) U.S. Cl.
USPC .......................................................... 360/75

(58) Field of Classification Search
USPC ......... 369/47.1, 47.28, 44.27; 360/51, 69, 75, 360/77.07, 46, 77.04, 77.08, 39, 45
See application file for complete search history.

(56) References Cited

U.S. PATENT DOCUMENTS

| 4,860,130 | A | * | 8/1989 | Yokosawa et al. | 360/77.15 |
| 5,041,926 | A | | 8/1991 | Ockerse et al. | |
| 5,398,140 | A | | 3/1995 | Rhodes et al. | |
| 5,461,519 | A | * | 10/1995 | Yoshihiro et al. | 360/70 |
| 6,115,198 | A | * | 9/2000 | Reed et al. | 360/46 |
| 6,278,568 | B1 | | 8/2001 | Cloke et al. | |
| 6,826,140 | B2 | * | 11/2004 | Brommer et al. | 369/94 |
| 7,068,459 | B1 | * | 6/2006 | Cloke et al. | 360/75 |
| 7,116,514 | B2 | | 10/2006 | Mahnad et al. | |
| 7,440,221 | B2 | | 10/2008 | Tsuchinaga et al. | |
| 7,872,825 | B2 | | 1/2011 | Sanghvi | |
| 7,948,708 | B2 | * | 5/2011 | Messner et al. | 360/77.08 |
| 8,049,982 | B1 | | 11/2011 | Grundvig et al. | |
| 8,379,498 | B2 | * | 2/2013 | Mathew et al. | 369/47.28 |

(Continued)

FOREIGN PATENT DOCUMENTS

| CN | 200710124526.0 | | 5/2009 | |
| EP | 13154452 | | 5/2013 | |
| JP | 60-201556 | * | 10/1985 | 360/77.08 |
| WO | 2009/062445 A1 | | 5/2009 | |

OTHER PUBLICATIONS

E. Soljanin et al., "Coding for Two-Head Recording Systems," IEEE Transactions on Information Theory, May 1995, pp. 747-755, vol. 41, No. 3.

(Continued)

*Primary Examiner* — Nabil Hindi
(74) *Attorney, Agent, or Firm* — Ryan, Mason & Lewis, LLP (57) ABSTRACT

A hard disk drive or other disk-based storage device comprises a storage disk, a read/write head configured to read data from and write data to the storage disk, and control circuitry coupled to the read/write head and configured to process data received from and supplied to the read/write head and to control positioning of the read/write head relative to the storage disk. The control circuitry comprises an inter-track interference detector configured to process a signal read from at least a given track of the storage disk via the read/write head in order to detect interference in that signal from at least one other track of the storage disk. The control circuitry further comprises an inter-track interference based head position controller configured to adjust the positioning of the read/write head responsive to the detected interference.

24 Claims, 5 Drawing Sheets

(56) References Cited

U.S. PATENT DOCUMENTS

| | | |
|---|---|---|
| 2008/0055767 A1 | 3/2008 | Abe et al. |
| 2008/0062550 A1 | 3/2008 | Lu |
| 2008/0174905 A1 | 7/2008 | Ueda |
| 2008/0259488 A1 | 10/2008 | Kang et al. |
| 2010/0238584 A1 | 9/2010 | Messner et al. |

OTHER PUBLICATIONS

M.P. Vea et al., "Magnetic Recording Channel Model with Intertrack Interference," IEEE Transactions on Magnetics, Nov. 1991, pp. 4834-4836, vol. 27, No. 6.

W.W. Ee, "Digital Position Error Signal Generation in Magnetic Disk Drives," National University of Singapore, 2003, 187 pages.

P.J. Davey et al., "Two-Dimensional Coding for a Multi-Track Recording System to Combat Inter-Track Interference," IEEE Transactions on magnetics, Jul. 1998, pp. 1949-1951, vol. 34, No. 4.

L.M.M. Myint et al., "An Inter-Track Interference Mitigation Technique Using Partial ITI Estimation in Patterned Media Storage," IEEE Transactions on Magnetics, Oct. 2009, pp. 3691-3694, vol. 45, No. 10.

M. Fujii et al., "Multi-Track Iterative ITI Canceller for Shingled Write Recording," International Symposium on Communications and Information Technologies (ISCIT), Oct. 2010, pp. 1062-1067.

E.F. Haratsch et al., "Intertrack Interference Cancellation for Shingled Magnetic Recording," IEEE Transactions on Magnetics, Oct. 2011, pp. 3698-3702, vol. 47, No. 10.

S. Nabavi et al., "Signal Processing for Bit-Patterned Media (BPM) Channels," Carnegie Mellon, The Data Storage Systems Center (DSSC), Electrical & Computer Engineering, Dec. 2008, 46 pages.

U.S. Appl. No. 13/250,419, filed in the name of Springberg et al. on Sep. 30, 2011 and entitled "Disk-Based Storage Device Having Write Signal Compensation for Magnetization Polarity of Adjacent Bits."

\* cited by examiner

DISK-BASED STORAGE DEVICE WITH HEAD POSITION CONTROL RESPONSIVE TO DETECTED INTER-TRACK INTERFERENCE

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

Conventional HDDs typically employ a read/write head position control system in which position error detection fields, generally referred to as "servo" marks, are written at fixed intervals on the storage disk. These servo marks are written only once at drive manufacture, utilizing a servo writer. By way of example, in a wedge servo arrangement, the servo marks are formed in designated radial wedges distributed around the disk. Data wedges between the servo wedges contain multiple data sectors and consume most of the track capacity. A servo algorithm uses the servo marks from the servo wedges to detect head position. No position feedback is available during the data wedge, so the servo algorithm typically must interpolate head position between the detected servo marks. Other arrangements of servo marks are also possible. For example, servo marks may be distributed evenly throughout the disk, rather than organized into servo wedges.

During HDD operation, drive hardware reads the servo marks in order to calculate an estimate of read/write head position error, which is then used in a firmware control loop to maintain the radial position of the read/write head. Because disk space dedicated for servo marks cannot be utilized to store user data, the number of servo marks written on the disk defines a tradeoff between the bandwidth of the read/write head position control loop and the capacity of the drive.

The storage capacity of HDDs continues to increase, and HDDs that can store multiple terabytes (TB) of data are currently available. However, increasing the storage capacity often involves shrinking track dimensions in order to fit more tracks onto each storage disk, such that inter-track interference (ITI) and read/write head position become important performance-limiting issues. Also, read/write head scaling is limited, so eventually the magnetic field used to write one track will impact adjacent tracks and thereby limit track density.

A number of recording techniques have been developed in an attempt to further increase HDD storage capacity. For example, a recording technique known as shingled magnetic recording (SMR) attempts to increase storage capacity of an HDD by "shingling" a given track over a previously written adjacent track on a storage disk. In another recording technique, referred to as bit-patterned media (BPM), high density tracks of magnetic islands are preformed on the surface of the storage disk, and bits of data are written to respective ones of these islands. Nonetheless, ITI and read/write head position remain important performance-limiting issues with these and other HDD recording techniques.

The adverse impact of ITI on HDD performance may be addressed in some cases through application of ITI cancellation techniques upon readout. Such cancellation techniques may involve, for example, performing ITI reduction post-processing on data read from the storage disk. In a technique of this type, information about an interfering data pattern stored on an adjacent track is used to detect ITI-induced read signal noise, and to cancel that noise from the read signal before normal data recovery processing is applied. However, reduction post-processing typically requires that the interfering data be read from the storage disk and stored in memory, which can increase HDD cost and complexity while also adversely impacting other performance measures such as access time.

It is also possible to reduce ITI by compensatory pre-processing of a write signal in a manner that takes adjacent bit polarities into account. Write compensation techniques of this type are disclosed in U.S. Pat. application Ser. No. 13/250,419, filed Sep. 30, 2011 and entitled "Disk-Based Storage Device having Write Signal Compensation for Magnetization Polarity of Adjacent Bits," which is commonly assigned herewith and incorporated by reference herein.

SUMMARY

Illustrative embodiments of the present invention provide HDDs or other types of disk-based storage devices that exhibit enhanced operating performance by controlling head position based at least in part on detected ITI. For example, an HDD in accordance with such an embodiment may detect ITI as part of an ITI cancellation process or otherwise, and provide information regarding the detected ITI to a head position controller that adjusts head position responsive to the detected ITI.

The ITI-based head position control in one or more embodiments may be utilized in conjunction with or in place of conventional servo-based head position control. The use of ITI for head position control can be particularly beneficial in that ITI feedback is nearly always available, whereas servo feedback is generally available only when servo marks are processed at regular intervals on the storage disk.

In one embodiment, an HDD or other disk-based storage device comprises a storage disk, a read/write head configured to read data from and write data to the storage disk, and control circuitry coupled to the read/write head and configured to process data received from and supplied to the read/write head and to control positioning of the read/write head relative to the storage disk. The control circuitry in this embodiment comprises an ITI detector configured to process a signal read from at least a given track of the storage disk via the read/write head in order to detect ITI in that signal from at least one other track of the storage disk. The control circuitry further comprises an ITI-based head position controller configured to adjust the positioning of the read/write head responsive to the detected ITI.

The ITI-based head position controller may be part of, or otherwise configured to operate in conjunction with, a servo controller that generates servo timing information by detecting a timing pattern of servo marks on a surface of the storage disk. For example, the servo controller may incorporate the head position controller and may be configured to control positioning of the read/write head utilizing both the servo timing information and information characterizing the detected ITI. As noted above, however, the ITI-based head position control does not require the use of servo control.

One or more of the embodiments of the invention provide significant improvements in disk-based storage devices. For example, by adjusting head position based at least in part on detected ITI, head position can be optimized for data recovery in the presence of ITI. This allows head position accuracy to be improved, with or without the use of conventional servo control, thereby providing better performance at low cost. Furthermore, such an arrangement allows track pitch to be reduced, thereby providing increased storage capacity for a given storage disk.

DETAILED DESCRIPTION

Embodiments of the invention will be illustrated herein in conjunction with exemplary disk-based storage devices, control circuitry and associated ITI-based head position control techniques. It should be understood, however, that these and other embodiments of the invention are more generally applicable to any disk-based storage device in which improved performance in terms of accurate and efficient head position control is desired. Additional embodiments may be implemented using components other than those specifically shown and described in conjunction with the illustrative embodiments.

Figure 1:
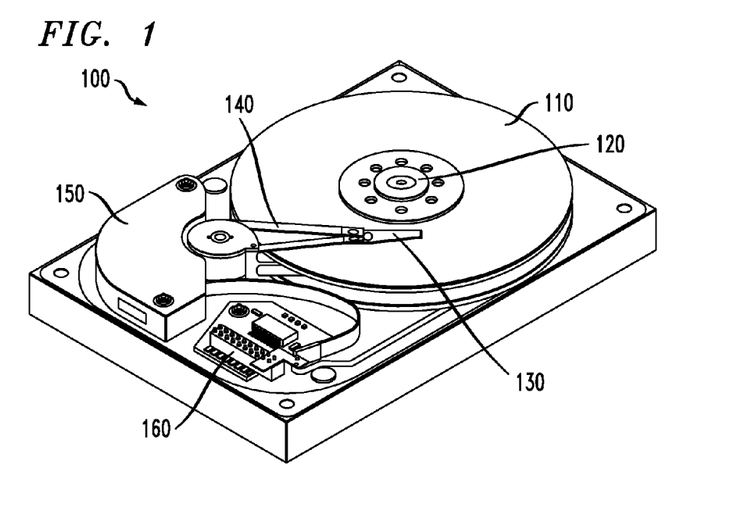
FIG. 1 shows a perspective view of a disk-based storage device in accordance with an illustrative embodiment of the invention.

FIG. 1 shows a disk-based storage device 100 in accordance with an illustrative embodiment of the invention. The storage device 100 in this embodiment more specifically comprises an HDD that includes a storage disk 110. The storage disk 110 has a storage surface coated with one or more magnetic materials capable of storing data in the form of magnetization states. The storage disk 110 is connected to a spindle 120. The spindle 120 is driven by a spindle motor, not explicitly shown in the figure, in order to spin the storage disk 110 at high speed.

Data is read from and written to the storage disk 110 via a read/write head 130 that is mounted on a positioning arm 140. The position of the read/write head over the magnetic surface of the storage disk 110 is controlled by an electromagnetic actuator 150. The electromagnetic actuator 150 and its associated driver circuitry in the present embodiment may be viewed as comprising a portion of what is more generally referred to herein as "control circuitry" of the storage device 100. Such control circuitry in this embodiment is assumed to further include additional electronics components arranged on an opposite side of the assembly and therefore not visible in the perspective view of FIG. 1. The term "control circuitry" as used herein is therefore intended to be broadly construed so as to encompass, by way of example and without limitation, drive electronics, signal processing electronics, and associated processing and memory circuitry, and may further encompass other elements utilized to control positioning of a read/write head relative to a storage surface of a storage disk in a storage device. A connector 160 is used to connect the storage device 100 to a host computer or other related processing device.

It is to be appreciated that, although FIG. 1 shows an embodiment of the invention with only one instance of each of the single storage disk 110, read/write head 130, and positioning arm 140, this is by way of illustrative example only, and alternative embodiments of the invention may comprise multiple instances of one or more of these or other drive components. For example, one such alternative embodiment may comprise multiple storage disks attached to the same spindle so all such disks rotate at the same speed, and multiple read/write heads and associated positioning arms coupled to one or more actuators. A given read/write head as that term is broadly utilized herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads.

Also, the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. The disclosed techniques are more generally applicable without limitation to any storage device application in which it is desirable to provide improved head position control within the storage device. Those skilled in the art will therefore recognize that a wide variety of other storage device configurations may be used in implementing embodiments of the invention.

Figure 2:
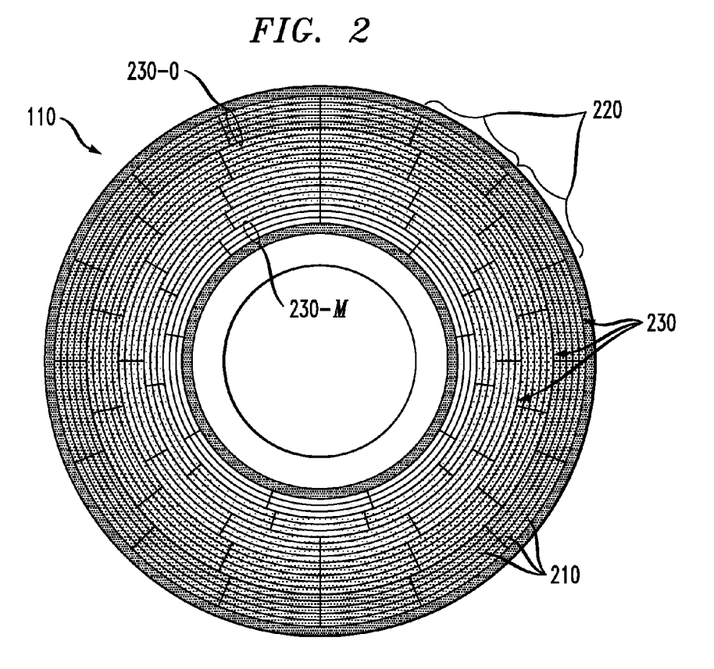
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 which are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Data bit density is generally constant across the entire storage surface of the storage disk 110, which results in higher data transfer rates at the outer zones. Since each outer zone stores more data than the inner zones, the read/write head need not be moved as frequently to read a given amount of data when accessing data in the outer zones. Data can therefore be transferred at a higher rate to or from tracks in the outer zones than to or from tracks in the inner zones.

Accordingly, the outermost annular zone 230-0 of the storage disk has a higher average data transfer rate than the innermost annular zone 230-M of the storage disk. The average data transfer rates may differ between the innermost and outermost annular zones in a given embodiment by more than a factor of two.

As one example embodiment, provided by way of illustration only, the outermost annular zone may have a data transfer rate of approximately 2.3 Gigabits per second (Gb/s), while the innermost annular zone has a data transfer rate of approximately 1.0 Gb/s. In such an implementation, the HDD may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

The storage disk 110 is also assumed to include a timing pattern formed on its storage surface. Such a timing pattern may comprise one or more sets of servo address marks (SAMs) or other types of servo marks formed in particular sectors in a conventional manner. SAMs may therefore be viewed as an example of what are more specifically referred to herein as servo marks. Thus, a "timing pattern" as that term is used herein is intended to encompass an arrangement of multiple servo marks.

The storage device 100 may implement a disk locked clock (DLC) technique to reduce frequency and phase differences between an internal read channel clock and a servo timing pattern on a surface of the storage disk 110. This allows data sectors to be written with less frequency variation, such that a clock recovery loop in the read channel does not have to handle as much frequency variation when the data sectors are read. A typical DLC technique may involve, for example, measuring the position and phase of servo marks that provide the timing pattern on the surface of the storage disk. Additional details regarding measurement of servo marks in an HDD or other disk-based storage device may be found in U.S. Pat. No. 8,049,982, entitled "Methods and Apparatus for Measuring Servo Address Mark Distance in a Read Channel Using Selective Fine Phase Estimate," which is commonly assigned herewith and incorporated by reference herein.

The particular data transfer rates and other features referred to in the embodiment described above are presented for purposes of illustration only, and should not be construed as limiting in any way. A wide variety of other data transfer rates and storage disk configurations may be used in other embodiments.

Embodiments of the invention will be described below in conjunction with FIGS. 3 to 5, in which the storage device 100 of FIG. 1 is configured to implement a process for ITI-based head position control. Although in these embodiments the ITI-based head position control is utilized in conjunction with otherwise conventional servo-based head position control, other embodiments may implement ITI-based head position control without the use of servo-based head position control.

Figure 3:
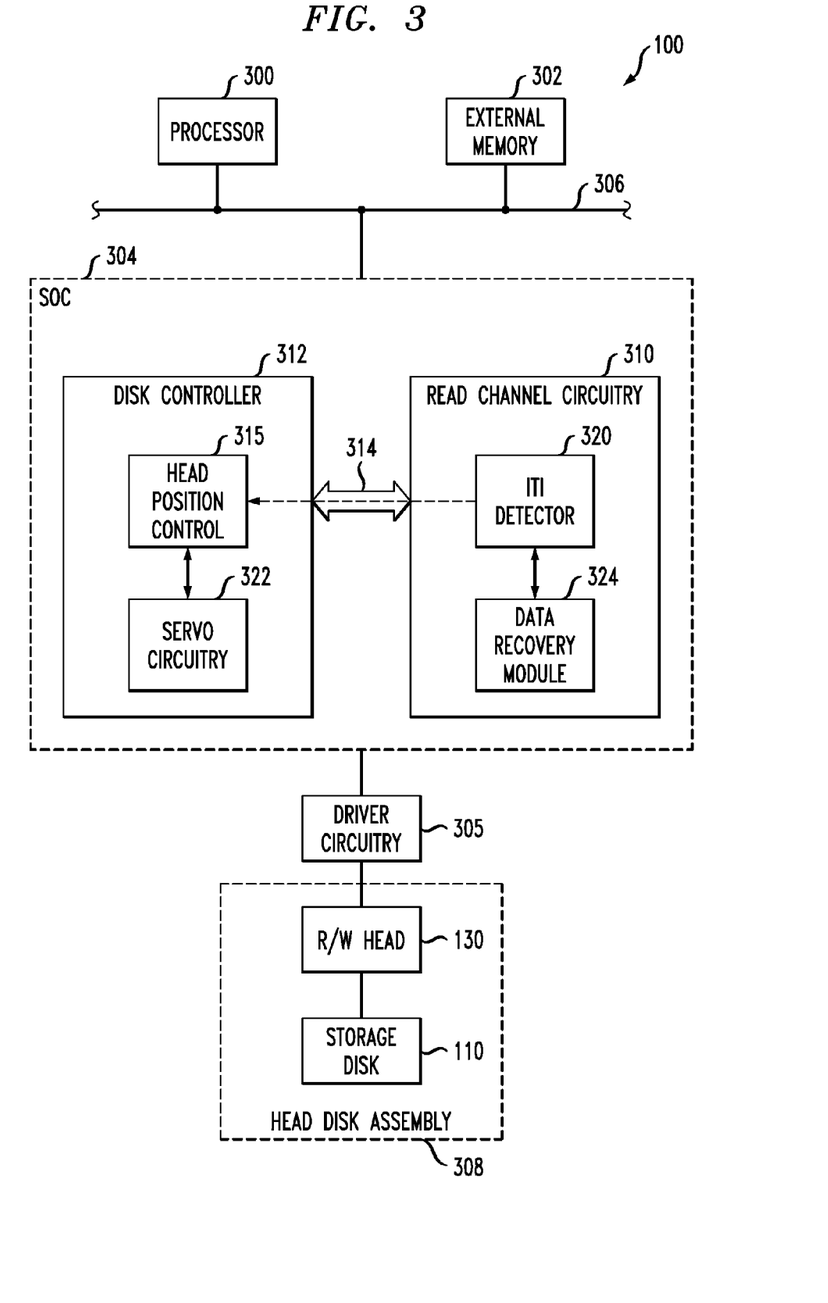
FIG. 3 is a block diagram of a portion of the storage device of FIG. 1 including an exemplary system-on-chip comprising a disk controller and read channel circuitry.

FIG. 3 shows a portion of the storage device 100 of FIG. 1 in greater detail. In this view, the storage device 100 comprises a processor 300, a memory 302 and a system-on-a-chip (SOC) 304, which communicate over a bus 306. The storage device further comprises driver circuitry 305 providing an interface between the SOC 304 and the read/write head 130. The driver circuitry 305 may comprise, for example, a preamplifier and other associated interface circuitry. The memory 302 is an external memory relative to the SOC 304 and other components of the storage device 100, but is nonetheless internal to that storage device. The read/write head 130 and storage disk 110 are collectively denoted in FIG. 3 as comprising a head disk assembly (HDA) 308.

The SOC 304 in the present embodiment includes read channel circuitry 310 and a disk controller 312, and directs the operation of the read/write head 130 in reading data from and writing data to the storage disk 110. The read channel circuitry 310 and the disk controller 312 communicate with one another over one or more interface connections 314 that may be viewed as representing a portion of the bus 306.

The bus 306 may comprise, for example, one or more interconnect fabrics. Such fabrics may be implemented in the present embodiment as Advanced eXtensible Interface (AXI) fabrics, described in greater detail in, for example, the Advanced Microcontroller Bus Architecture (AMBA) AXI v2.0 Specification, which is incorporated by reference herein. The bus may also be used to support communications between other system components, such as between the SOC 304 and the driver circuitry 305. It should be understood that AXI interconnects are not required, and that a wide variety of other types of bus configurations may be used in embodiments of the invention.

The disk controller 312 comprises a head position controller 315 that is responsive to detected ITI from an ITI detector 320 implemented in the read channel circuitry 310. The head position controller 315 is also responsive to servo timing information provided by servo circuitry 322. The ITI detector 320 is generally configured to process a signal read from at least a given track of the storage disk 110 via the read/write head 130 in order to detect interference in that signal from at least one other track of the storage disk. In the present embodiment, the signal processed by the ITI detector 320 is provided by a data recovery module 324, but in other embodiments other types of signals may be utilized by the ITI detector to detect ITI in those signals.

It should be noted in this regard that the term "inter-track interference" is intended to be broadly construed, and may encompass interference created in a signal read from a given track by one or more other tracks. The one or more other tracks that create the interference in the signal read from the given track may comprise one or more adjacent tracks, as well as or alternatively one or more non-adjacent tracks. Thus, "inter-track interference" as the term is used herein is intended to encompass adjacent-track interference as well as interference from one or more non-adjacent tracks.

The head position controller 315 in the present embodiment is configured to adjust the radial position of the read/write head 130 responsive to interference detected by the ITI detector 320. For example, the head position controller 315 may be configured to adjust positioning of the read/write head based at least in part on information characterizing the detected interference, such as information comprising one or more ITI metrics generated by the ITI detector 320. In this embodiment, the head position controller 315 also adjusts the radial position of the read/write head 130 based on servo timing information generated by servo circuitry 322 detecting a timing pattern on a surface of the storage disk, where the timing pattern comprises a plurality of servo marks formed on that surface. The head position controller 315 may thus be viewed as comprising an otherwise conventional servo controller that is configured to control positioning of the read/ write head 130 utilizing both servo timing information and information characterizing detected ITI.

Other embodiments may implement only ITI-based head position control. The term "ITI-based head position controller" is therefore intended to encompass any arrangement in which detected ITI is utilized to control position of a read/write head in a storage device, including arrangements with or without associated servo-based head position control.

By way of example, servo-based head position control can interact with ITI-based head position control in a given embodiment by correlating servo-based head position measurements with detected ITI metrics. The correlation parameters may be consistent for the entire storage disk, or may vary for different zones of the storage disk.

Although the head position controller 315 and ITI detector 320 are illustratively shown in FIG. 3 as being implemented within the disk controller 312 and read channel circuitry 310, respectively, in other embodiments the elements 315 and 320 may be arranged in other ways. For example, the ITI detector 320 may be implemented at least in part within the disk controller 312, or the head position controller 315 may be implemented at least in part within the read channel circuitry 310.

The processor 300, memory 302, SOC 304 and driver circuitry 305 may be viewed as collectively comprising one possible example of "control circuitry" as that term is utilized herein. Numerous alternative arrangements of control circuitry may be used in other embodiments, and such arrangements may include only a subset of the components 300, 302, 304 and 305, or portions of one or more of these components. For example, the SOC 304 itself may be viewed as an example of "control circuitry." As noted above, the control circuitry of the storage device 100 in the embodiment as shown in FIG. 3 is generally configured to process data received from and supplied to the read/write head 130 and to control positioning of the read/write head 130 relative to the storage disk 110.

It should be noted that certain operations of the SOC 304 in the storage device 100 of FIG. 3 may be directed by processor 300, which executes code stored in external memory 302. For example, the processor 300 may be configured to execute code stored in the memory 302 for performing at least a portion of an ITI-based head position control process carried out by the SOC 304. Thus, at least a portion of the ITI detection and head position control functionality of the storage device 100 may be implemented at least in part in the form of software code.

The external memory 302 may comprise electronic memory such as random access memory (RAM) or read-only memory (ROM), in any combination. In the present embodiment, it is assumed without limitation that the external memory 302 is implemented at least in part as a double data rate (DDR) synchronous dynamic RAM (SDRAM). The memory 302 is an example of what is more generally referred to herein as a "computer-readable storage medium." Such a medium may also be writable.

Although the SOC 304 in the present embodiment is assumed to be implemented on a single integrated circuit, that integrated circuit may further comprise portions of the processor 300, memory 302, driver circuitry 305 and bus 306. Alternatively, portions of the processor 300, memory 302, driver circuitry 305 and bus 306 may be implemented at least in part in the form of one or more additional integrated circuits, such as otherwise conventional integrated circuits designed for use in an HDD and suitably modified to provide ITI-base head position control functionality as disclosed herein.

An example of an SOC integrated circuit that may be modified to incorporate an embodiment of the present invention is disclosed in U.S. Pat. No. 7,872,825, entitled "Data Storage Drive with Reduced Power Consumption," which is commonly assigned herewith and incorporated by reference herein.

Other types of integrated circuits that may be used to implement processor, memory or other storage device components of a given embodiment include, for example, a microprocessor, digital signal processor (DSP), application-specific integrated circuit (ASIC), field-programmable gate array (FPGA) or other integrated circuit device.

In an embodiment comprising an integrated circuit implementation, multiple integrated circuit dies may be formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of the invention.

Although shown as part of the storage device 100 in the present embodiment, one or both of the processor 300 and memory 302 may be implemented at least in part within an associated processing device, such as a host computer or server in which the storage device is installed. Accordingly, elements 300 and 302 in the FIG. 3 embodiment may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

Figure 4:
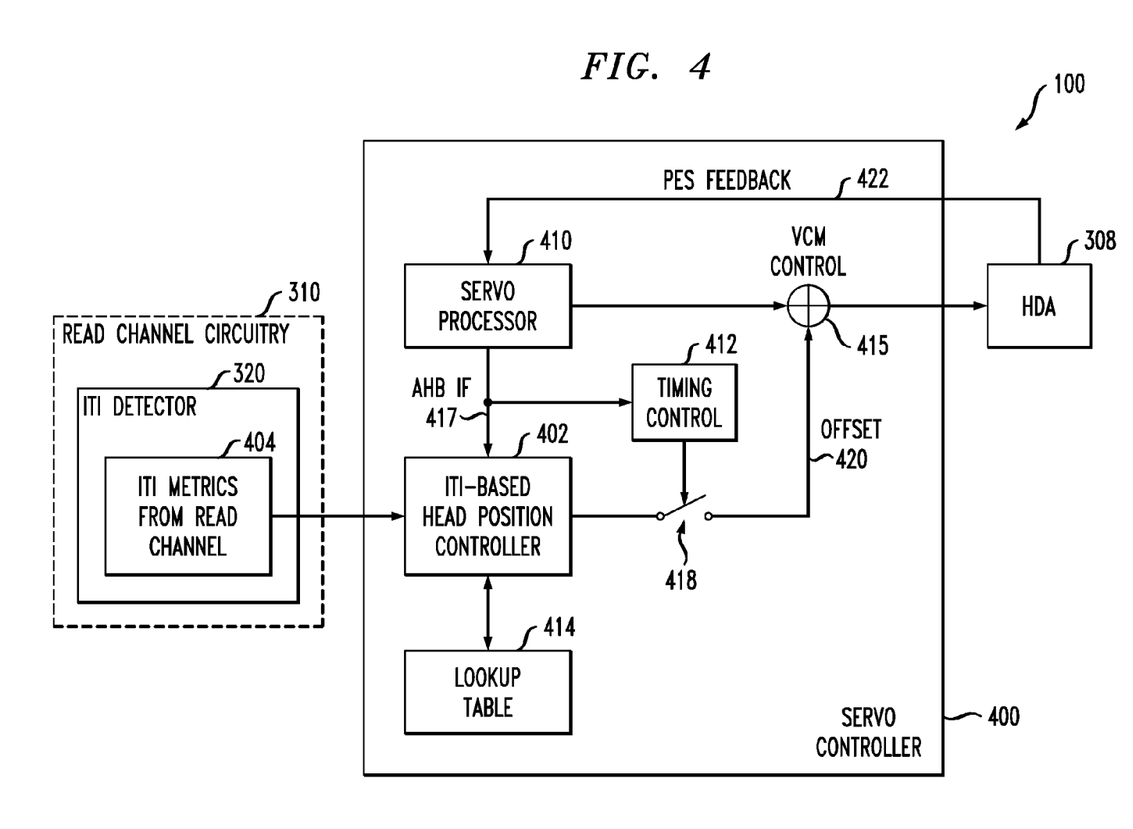
FIG. 4 shows another view of a portion of the storage device of FIG. 1.

FIG. 4 shows a more detailed view of one possible implementation of ITI detector 320 and an associated head position controller 315 within storage device 100. In this embodiment, a servo controller 400 implements ITI-based head position control using an ITI-based head position controller 402. The ITI-based head position controller receives ITI metrics 404 from the ITI detector 320 in the read channel circuitry 310. The servo controller 400 also implements servo-based head position control using servo processor 410. The servo controller 400 in the present embodiment may be viewed as a combination of head position controller 315 and servo circuitry 322.

The servo controller 400 also includes a timing control module 412, a lookup table 414, an adjustment motor control module 415, an interface bus 417 and a switch 418. The timing control module 412 and switch 418 are examples of what are more generally referred to herein as timing control circuitry and switching circuitry, respectively. Although not expressly illustrated in FIG. 4, it is assumed that the head disk assembly 308 comprises an adjustment motor that alters the radial position of the read/write head 130 relative to the surface of the storage disk 110 responsive to an output of the adjustment motor control module 415. In the present embodiment, the adjustment motor control module 415 is more particularly implemented in the form of a voice coil motor (VCM) control module comprising a signal combiner, but a wide variety of other circuitry arrangements may be used to implement this component of the servo controller 400 in other embodiments.

The interface bus 417 is illustratively shown as comprising an AMBA High-performance Bus (AHB), and may be part of the bus 306. Again, other types of bus configurations can be used in other embodiments.

The adjustment motor control module 415 receives respective control signals from the servo processor 410 and the ITI-based head position controller 402. The control signal from the ITI-based head position controller 402 is generated at least in part by addressing the lookup table 414 utilizing information characterizing the detected interference, such as one or more of the read channel ITI metrics 404. This control signal more particularly comprises an offset signal indicative of a desired offset adjustment to be applied to the read/write head 130 via the adjustment motor control module 415. The switch 418 selectively applies the control signal from the ITI-based head position controller 402 to an input of the adjustment motor control module 415 via offset signal line 420 responsive to an output of the timing control module 412. The operation of the timing control module 412 and ITI-based head position controller 402 is directed by servo processor 410 using one or more signals transmitted over the interface bus 417. In providing such direction to controller 402 and timing control module 412, the servo processor 410 makes use of position error signal (PES) feedback received in the processor 410 from the head disk assembly 308 via feedback path 422.

The servo processor 410 implements a servo algorithm for controlling position of the read/write head 130 based on servo timing information generated by detecting servo marks on the surface of the storage disk. A VCM control signal at the output of module 415 may be updated after each servo mark is processed, and is also updated to reflect a current offset as determined by the ITI-based head position controller 402. This offset is utilized in the present embodiment to fine tune the radial position of the read/write head on a substantially continuous basis between detected servo marks. The ITI-based head position control in this embodiment therefore supplements the servo-based head position control. The ITI feedback is particularly useful in that it is nearly always available as data is read from the storage disk. This is in contrast to servo feedback, which is generally available only when servo marks are processed at regular intervals on the storage disk.

In the FIG. 4 embodiment, the detector 320 may be configured to extract ITI from a data signal on a substantially continuous basis. The ITI detection may be performed in conjunction with an otherwise conventional ITI cancellation process, although ITI cancellation is not required in this embodiment. The ITI can be normalized to signal level in detector 320 in order to control for factors that are not indicative of head position change, such as fly height (i.e., the distance maintained between magnetic surfaces of the head and the storage disk as data is read from or written to the disk) and environment factors. The ITI metrics 404 may comprise normalized ITI or other related measures, such as composite energy of the ITI. These metrics are provided to the servo controller 400 as indicated in the figure. This transfer of ITI metrics may occur substantially continuously, as ITI is detected in a data signal read from the storage disk, or periodically, for example, when a specified ITI threshold is crossed, or as requested by the servo controller 400, depending upon the particular implementation of the control loop. The servo controller is generally configured to adjust the head position to keep the head in an optimal position for data recovery.

Figure 5A:
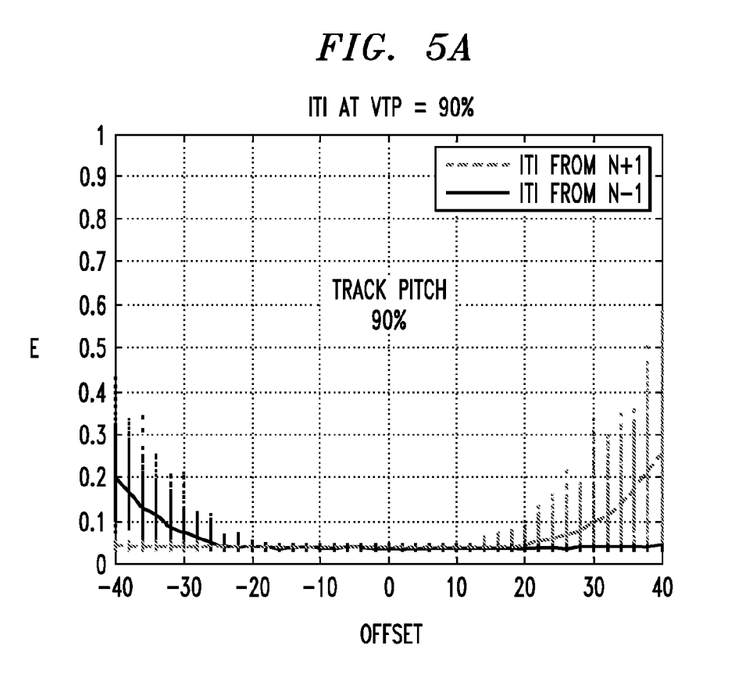
FIGS. 5A and 5B illustrate variations in ITI as a function of read/write head offset in embodiments of the invention.
Figure 5B:
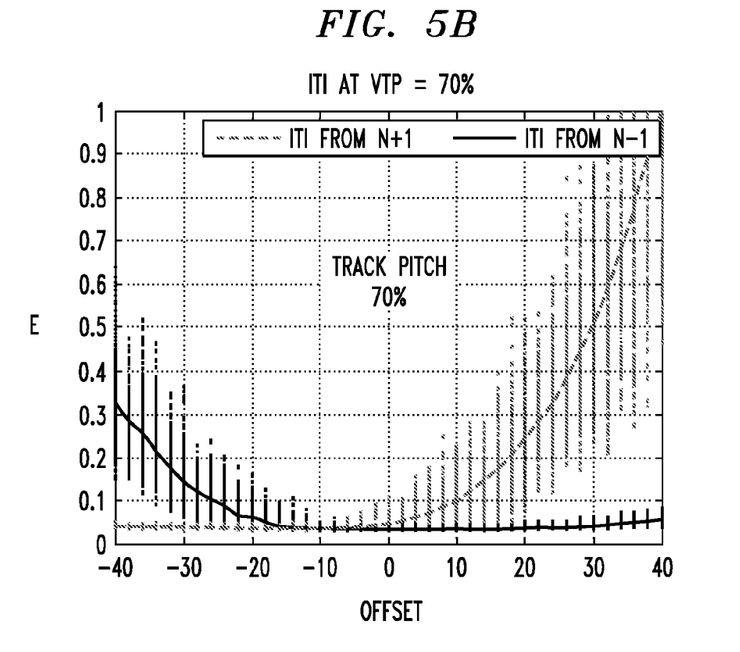

It should be understood that the optimal position for data recovery is not necessarily the center of the track being read, as will now be illustrated in conjunction with FIGS. 5A and 5B. These figures illustrate variations in ITI as a function of read/write head offset relative to track center in embodiments of the invention. The ITI in this example is expressed in terms of a particular type of metric, namely composite energy (E), while the offset is expressed as a percentage of the track pitch. Each of the figures corresponds to a different amount of variation in track pitch (VTP) relative to a nominal original track pitch.

In FIG. 5A, track pitch has been reduced by 10% relative to an original track pitch, such that the reduced track pitch is 90% of the original track pitch. It can be seen from this figure that in this case the head position can be off center by about +15% or −20% before ITI becomes significant. Also, it is apparent that increasing the negative offset relative to the center of current track N leads to increasing amounts of ITI from adjacent track N−1, while increasing the positive offset relative to the center of track N leads to increasing amounts of ITI from adjacent track N+1. The optimal head position in this example appears to be a small negative offset relative to track center. Such an offset can be introduced by the servo controller 400 via ITI-based head position controller 402 and offset line 420, under the control of servo processor 410 and its associated timing control module 412, as previously described. The servo controller in this example will generally attempt to maintain the head at a negative offset position that minimizes the composite energy of the ITI in the data signal read from the disk.

The need for such an offset is even more apparent in the example of FIG. 5B, where track pitch has been reduced by 30% relative to an original track pitch, such that the reduced track pitch is 70% of the original track pitch. In this case, substantial amounts of ITI result even with relatively small deviations of the head from its optimal position. As in the FIG. 5A example, the optimal position does not correspond to the track center. Again, the servo controller 400 in this case will attempt to maintain the head at a negative offset position that minimizes the composite energy of the ITI in the data signal read from the disk.

Using ITI composite energy to estimate head position can be especially effective in cases where write processes introduce significant ITI, since in such cases the ITI actually creates additional position estimation information rather than degrading control loop performance. Moreover, the use of ITI-based head position control as in the FIG. 4 embodiment allows head position estimates to be provided substantially continuously as data is read from the disk, rather than only at the servo marks in the case of servo-based head position control. As a result, the ITI-based head position control provides a much higher bandwidth control loop without sacrificing disk capacity.

As noted above, the ITI metrics 404 may be obtained from an otherwise conventional ITI cancellation process. Such processes may include single-sided or double-sided ITI cancellation. Single-sided ITI cancellation detects and cancels ITI from a single adjacent track. In this case, the servo controller 400 may be configured to keep the head positioned near the relevant adjacent track, in order to ensure that the head does not drift towards the opposite adjacent track for which no ITI is being extracted. Double-sided ITI cancellation detects and cancels ITI from both adjacent tracks. In this case, the servo controller 400 may be configured to position the head between the two adjacent tracks such that the total ITI induced by the two adjacent tracks is minimized.

It should be noted that, particularly in the single-sided ITI cancellation case, servo-based head position control may be used as an excursion limiter, preventing ITI-based head position control from moving the head too far away from one adjacent track and consequently encroaching upon the opposite adjacent track.

In a given embodiment, an ITI metric such as ITI composite energy may be obtained for each data block within each data sector shortly after it is read from the disk. Block length determines a tradeoff between ITI estimate accuracy and control loop bandwidth. The servo controller 400 may be configured to compare this ITI composite energy for the current data block against a predetermined range and to adjust head position offset by a predetermined amount. These operations may be implemented at least in part utilizing lookup table 414. It should be noted that the ITI metrics can also be utilized by the servo algorithm that operates on the detected servo marks.

As indicated previously, it is not necessary to obtain ITI metrics substantially continuously, such as for every data block, and in other embodiments such metrics may be obtained and processed by servo controller 400 on a periodic basis, for example, only when the ITI composite energy falls outside of a defined range.

It is to be appreciated that the particular circuitry arrangements shown in FIGS. 3 and 4 are presented by way of example only, and other embodiments of the invention may utilize other types and arrangements of additional or alternative components. Control circuitry of a storage device in these other embodiments may comprise dedicated hardware as well as processor or memory resources that are utilized to execute software.

As noted above, the configuration of storage device 100 can be varied in other embodiments of the invention. For example, a storage device in another embodiment of the invention may comprise a hybrid HDD which includes a flash memory in addition to one or more storage disks.

It should also be understood that the particular storage disk configuration and recording mechanism can be varied in other embodiments of the invention. For example, recording techniques such as shingled magnetic recording (SMR) and bit-patterned media (BPM) can be used in one or more embodiments of the invention.

Figure 6:
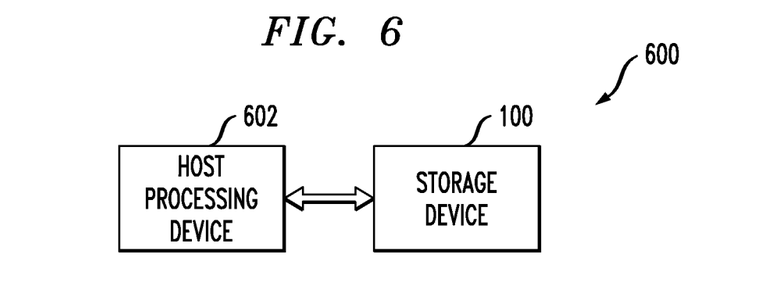
FIG. 6 illustrates interconnection of the storage device of FIG. 1 with a host processing device in a data processing system.

FIG. 6 illustrates a processing system 600 comprising the disk-based storage device 100 coupled to a host processing device 602, which may be a computer, server, communication device, etc. Although shown as a separate element in this figure, the storage device 100 may be incorporated into the host processing device. Instructions such as read commands and write commands directed to the storage device 100 may originate from the processing device 602, which may comprise processor and memory elements similar to those previously described in conjunction with FIG. 3.

Figure 7:
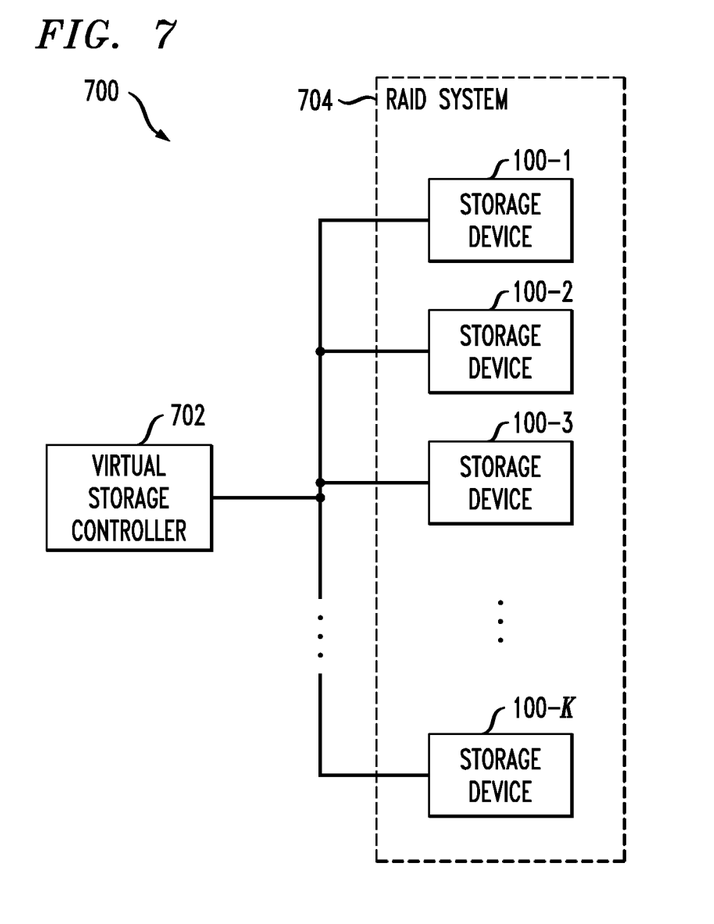
FIG. 7 shows a virtual storage system incorporating a plurality of disk-based storage devices of the type shown in FIG. 1.

Multiple disk-based storage devices 100 may be incorporated into a virtual storage system 700 as illustrated in FIG. 7. The virtual storage system 700, also referred to as a storage virtualization system, illustratively comprises a virtual storage controller 702 coupled to a RAID system 704, where RAID denotes Redundant Array of Independent Disks. The RAID system more specifically comprises K distinct storage devices denoted 100-1, 100-2, . . . 100-K, one or more of which are assumed to be configured to include ITI-based head position control functionality as disclosed herein. These and other virtual storage systems comprising HDDs or other disk-based storage devices of the type disclosed herein are considered embodiments of the invention. The host processing device 602 in FIG. 6 may also be an element of a virtual storage system, and may incorporate the virtual storage controller 702.

Again, it should be emphasized that the above-described embodiments of the invention are intended to be illustrative only. For example, other embodiments can use different types and arrangements of storage disks, read/write heads, control circuitry and other storage device elements for implementing the described functionality. Also, the particular manner in which head position control is provided based on detected ITI may be varied in other embodiments. These and numerous other alternative embodiments within the scope of the following claims will be apparent to those skilled in the art.

What is claimed is:

1. An apparatus comprising:
    control circuitry adapted for coupling to a read/write head configured to read data from and write data to a storage disk, the control circuitry being configured to process data received from and supplied to the read/write head and to control positioning of the read/write head relative to the storage disk;
    the control circuitry comprising:
    an inter-track interference detector configured to process a signal read from at least a given track of the storage disk via the read/write head in order to detect interference in that signal from at least one other track of the storage disk; and
    an inter-track interference based head position controller configured to adjust said positioning of the read/write head responsive to the detected interference.

2. The apparatus of claim 1 wherein the inter-track interference based head position controller is configured to adjust said positioning of the read/write head based at least in part on information characterizing the detected interference, said information comprising one or more inter-track interference metrics.

3. The apparatus of claim 1 wherein the control circuitry comprises:
    read channel circuitry; and
    a disk controller coupled to the read channel circuitry;
    wherein the inter-track interference detector is implemented at least in part within the read channel circuitry.

4. The apparatus of claim 3 wherein the inter-track interference based head position controller is implemented at least in part within the disk controller.

5. The apparatus of claim 1 wherein the control circuitry comprises a servo controller configured to control positioning of the read/write head based at least in part on servo timing information generated by detecting a timing pattern on a surface of the storage disk, said timing pattern comprising a plurality of servo marks formed on that surface.

6. The apparatus of claim 5 wherein the servo controller is configured to control positioning of the read/write head utilizing both the servo timing information and information characterizing the detected interference.

7. The apparatus of claim 5 wherein the servo controller further comprises:
    a servo processor; and
    an adjustment motor control module adapted for coupling to a head disk assembly comprising the read/write head and the storage disk;
    wherein the adjustment motor control module receives respective control signals from the servo processor and the head position controller.

8. The apparatus of claim 7 wherein the control signal from the head position controller is generated at least in part by addressing a lookup table utilizing information characterizing the detected interference.

9. The apparatus of claim 7 wherein the control signal from the head position controller comprises an offset signal indicative of a desired offset adjustment to be applied to the read/write head via the adjustment motor control module.

10. The apparatus of claim 7 wherein the servo controller further comprises:

timing control circuitry coupled to the servo processor; and
switching circuitry configured to selectively apply the control signal from the head position controller to an input of the adjustment motor control module responsive to an output of the timing control circuitry.

11. The apparatus of claim 3 wherein the control circuitry comprises a system-on-chip integrated circuit that implements at least a portion of both the disk controller and the read channel circuitry.

12. The apparatus of claim 1 wherein the control circuitry comprises a processor and a memory coupled to the processor, the processor being configured to execute software code stored in the memory, wherein said software code when executed implements functionality associated with at least a portion of at least one of the inter-track interference detector and the head position controller.

13. The apparatus of claim 1 wherein the control circuitry is fabricated in at least one integrated circuit.

14. A storage device comprising the apparatus of claim 1.

15. A virtual storage system comprising the storage device of claim 14.

16. A method comprising the steps of:
processing a signal read from at least a given track of a storage disk via a read/write head in order to detect inter-track interference in that signal from at least one other track of the storage disk; and
adjusting a position of the read/write head responsive to the detected interference.

17. The method of claim 16 further comprising the step of generating servo timing information by detecting a timing pattern on a surface of the storage disk, said timing pattern comprising a plurality of servo marks formed on that surface, and wherein said adjusting step comprises adjusting a position of the read/write head utilizing both the servo timing information and information characterizing the detected interference.

18. The method of claim 16 wherein said adjusting step comprises generating a control signal at least in part by addressing a lookup table utilizing information characterizing the detected interference.

19. The method of claim 18 wherein said adjusting step comprises selectively applying the control signal to an adjustment motor responsive to servo timing information.

20. A non-transitory computer-readable storage medium having embodied therein executable code for performing the steps of the method of claim 16.

21. A storage device comprising:
at least one storage disk;
a read/write head configured to read data from and write data to the storage disk; and
control circuitry coupled to the read/write head and configured to process data received from and supplied to the read/write head and to control positioning of the read/write head relative to the storage disk;
wherein the control circuitry comprises:
an inter-track interference detector configured to process a signal read from at least a given track of the storage disk via the read/write head in order to detect interference in that signal from at least one other track of the storage disk; and
an inter-track interference based head position controller configured to adjust said positioning of the read/write head responsive to the detected interference.

22. The apparatus of claim 1 wherein said inter-track interference based head position controller is further configured to receive information characterizing the detected interference, and to adjust said positioning of the read/write head responsive to said received information.

23. The apparatus of claim 1 wherein said inter-track interference based head position controller is further configured to receive inter-track interference metrics, and to adjust said positioning of the read/write head responsive to said received inter-track interference metrics.

24. The apparatus of claim 1 wherein the signal in which the interference is detected is read from a particular track that is currently being scanned by the read/write head.

* * * * *